United States Patent
Yamaguchi et al.

(10) Patent No.: US 8,292,363 B2
(45) Date of Patent: Oct. 23, 2012

(54) CLUTCH MECHANISM

(75) Inventors: Takao Yamaguchi, Toyota (JP); Atsuki Sasaki, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1049 days.

(21) Appl. No.: 12/248,094

(22) Filed: Oct. 9, 2008

(65) Prior Publication Data

US 2009/0126520 A1    May 21, 2009

(30) Foreign Application Priority Data

Nov. 21, 2007   (JP) ................................. 2007-301620

(51) Int. Cl.
*A47C 7/36*    (2006.01)
*B60N 2/427*   (2006.01)
(52) U.S. Cl. ...................... 297/216.12; 297/408; 297/61
(58) Field of Classification Search .................... 297/61, 297/408, 216.12, 216.13, 216.14
See application file for complete search history.

(56) References Cited

U.S. PATENT DOCUMENTS

| 7,044,545 | B2 * | 5/2006 | Ohchi et al. | 297/216.12 |
| 7,066,545 | B2 * | 6/2006 | Terada et al. | 297/61 |
| 7,445,283 | B2 * | 11/2008 | Mori | 297/216.12 |
| 7,523,987 | B2 * | 4/2009 | Yamaguchi | 297/216.12 |
| 8,020,930 | B2 * | 9/2011 | Niitsuma et al. | 297/216.12 |

FOREIGN PATENT DOCUMENTS

DE           10232017 C1    9/2003

OTHER PUBLICATIONS

English language Abstract of DE 10232017 C1.

* cited by examiner

*Primary Examiner* — Anthony D Barfield
(74) *Attorney, Agent, or Firm* — Greenblum & Bernstein, P.L.C.

(57) ABSTRACT

A clutch mechanism for selectively transmitting a force applied thereto may include an operation bracket that is rotatably connected to the vehicle seat via a first pivot shaft and is connected to a force output cable, a rotatable arm that is rotatably connected to the operation bracket via the first pivot shaft and is connected to a force input cable, and a swing arm that is rotatably connected to the operation bracket via a second pivot shaft. The operation bracket includes a curved slot formed therein. The rotatable arm includes an elongated slot that has a toothed portion. The swing arm includes an engagement portion that movably engages both of the curved slot of the operation bracket and the elongated slot of the rotatable arm.

5 Claims, 9 Drawing Sheets

CLUTCH MECHANISM

This application claims priority to Japanese patent application serial number 2007-301620, the contents of which are incorporated herein by reference.

BACKGROUND OF THE INVENTION

The present invention relates to clutch mechanisms for use in vehicle seats and force transmission mechanisms having such clutch mechanisms. More particularly, the present invention relates to clutch mechanisms that are constructed to function when external forces are applied thereto via force input cables (e.g., when seat backs of the seats are pressed rearwardly by backs of passengers sitting on the vehicle seats), thereby selectively transmitting the external forces to force output cables disposed in the seats as pulling forces, and force transmission mechanisms having such clutch mechanisms.

A clutch mechanism for use in a vehicle seat that is constructed to function when an external force is applied thereto is already known. Such a clutch mechanism is taught, for example, by German Patent Number 10232017.

This clutch mechanism is constructed to function when an external load or force is applied thereto (e.g., when a seat back of the seat is pressed rearwardly by a back of a passenger sitting on the seat), thereby transmitting the force to a lock mechanism of a head rest. Upon transmission of the force to the lock mechanism, the lock mechanism is changed to an unlocking condition, so that the head rest can be tilted forwardly. Further, this clutch mechanism is constructed to function only when the force is applied quickly.

The known clutch mechanism is constructed to be pneumatically actuated when the force is applied quickly thereto. Therefore, the clutch mechanism may not properly function depending on an ambient temperature even if the force is applied quickly. In addition, the pneumatically actuated clutch mechanism may have a complicated structure. This may lead to an increased manufacturing cost of the clutch mechanism.

BRIEF SUMMARY OF THE INVENTION

In one aspect of the present invention, a clutch mechanism for selectively transmitting a force applied thereto may include an operation bracket that is rotatably connected to the vehicle seat via a first pivot shaft and is connected to a force output cable, a rotatable arm that is rotatably connected to the operation bracket via the first pivot shaft and is connected to a force input cable, and a swing arm that is rotatably connected to the operation bracket via a second pivot shaft. The operation bracket includes a curved slot formed therein. The rotatable arm includes an elongated slot that has a toothed portion. The swing arm includes an engagement portion that movably engages both of the curved slot of the operation bracket and the elongated slot of the rotatable arm. When the force is applied quickly to the force input cable, the rotatable arm is rotated quickly about the first pivot shaft relative to the operation bracket whereas the swing arm is rotated slowly by a gravitational force about the second pivot shaft along with rotation of the rotatable arm, and as a result, the engagement portion of the swing arm engages the toothed portion of the elongated slot of the rotatable arm. Upon engagement of the engagement portion of the swing arm and the toothed portion of the rotatable arm, the rotatable arm can be rotationally locked with respect to the operation bracket, so that the operation bracket is rotated with the rotatable arm about the first pivot shaft, thereby allowing transmission of the force to the force output cable. When the force is applied slowly to the force input cable, the rotatable arm is rotated slowly about the first pivot shaft relative to the operation bracket while the swing arm is rotated slowly by the gravitational force about the second pivot shaft along with rotation of the rotatable arm, and as a result, the rotatable arm is continuously rotated relative to the operation bracket while moving the engagement portion of the swing arm along the elongated slot of the rotatable arm and the curved slot of the operation bracket. Upon continuous rotation of the rotatable arm relative to the operation bracket, the operation bracket can be prevented from being rotated about the first pivot shaft, thereby inhibiting the transmission of the force to the force output cable.

According to this aspect, when the force is applied quickly to the force input cable, the rotatable arm can be reliably rotationally locked with respect to the operation bracket (i.e., the rotatable arm can be mechanically integrated with the operation bracket), so that the operation bracket can be reliably rotated with the rotatable arm about the first pivot shaft. Therefore, when the force is applied quickly to the force input cable, the force can be reliably transmitted to the force output cable.

Also, because the swing arm is arranged and constructed to be rotated by the gravitational force about the second pivot shaft, it is not necessary to use springs or other such biasing members in order to rotate the swing arm. Therefore, the clutch mechanism may have a simplified structure. This may lead to an reduced manufacturing cost of the clutch mechanism.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings.

This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention is shown in FIG. 1 to FIG. 9.

Figure 1:
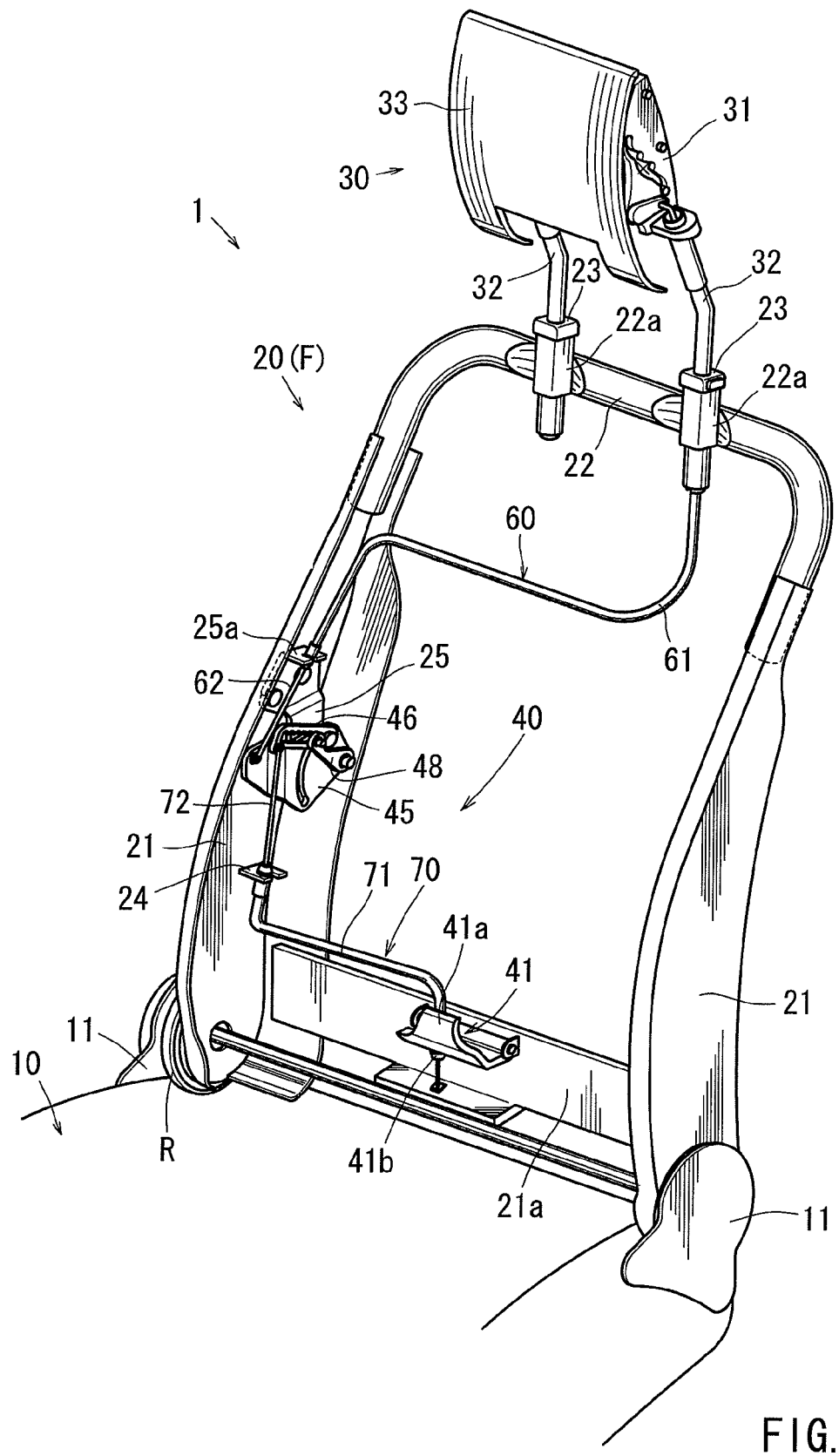
FIG. 1 is a perspective view of a vehicle seat having a lock release mechanism (a clutch mechanism) according to a representative embodiment of the present invention, in which covering members of a seat back and a head rest are omitted.

As shown in FIG. 1, a representative vehicle seat 1 may preferably include a seat cushion 10, a seat back 20 and a (active) head rest 30. The seat back 20 may preferably include a back frame F that is constituted of a pair of (right and left) vertical side frame elements 21, a lateral upper frame element 22 and a lateral lower plate-shaped frame element 21a. Lower end portions of the side frame elements 21 are respectively rotatably connected to reclining plates 11 of the seat cushion 10 via seat reclining devices R (one of which is shown), so that a tilting angle of the seat back 20 (the back frame F) relative to the seat cushion 10 can be adjusted by operating the seat reclining devices R. Naturally, the seat back 20 includes a cushion member and a covering member attached to the back frame F, which members are omitted in FIGS. 1 to 4 for clarity.

As shown in FIG. 1, the head rest 30 may preferably include a base element 31 and a head rest plate (a head rest main body) 33. The head rest plate 33 is movably connected to the base element 31 via a special linking mechanism. Also, the head rest 30 may include a pair of stays 32 that are integrally connected to the base element 31. The stays 32 are connected to the upper frame element 22 of the back frame F via a pair of attachment members 22a attached to the upper frame element 22. As will be appreciated, the attachment members 22a are respectively provided with retainers 23 that are capable of retaining the stays 32. Further, the head rest 30 includes a cushion member and a covering member attached to the head rest main body, which members are omitted in FIGS. 1 to 4 for clarity.

Figure 2:
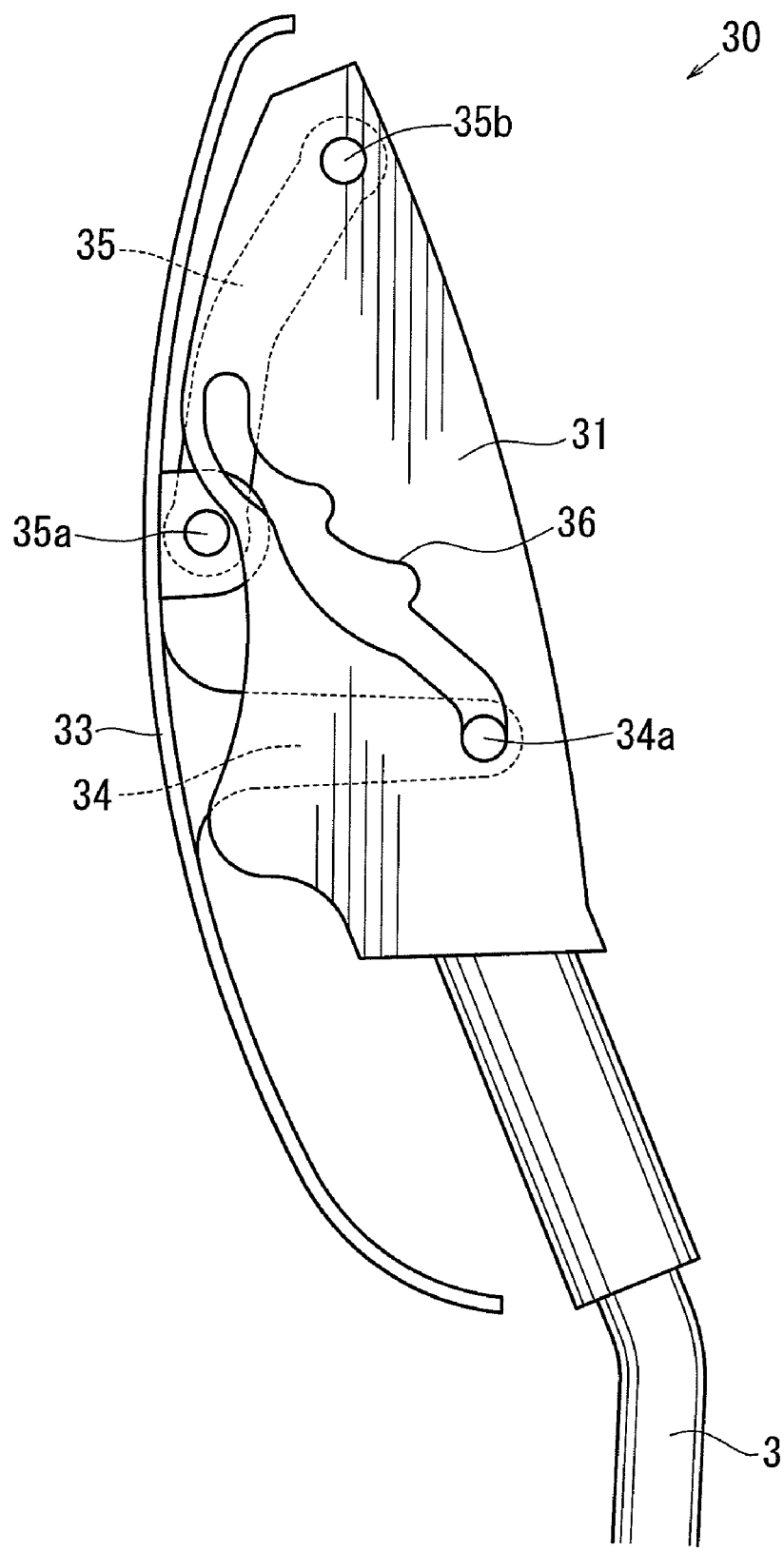
FIG. 2 is a side view of the head rest, illustrating a condition in which a head rest plate is in a normal position.
Figure 3:
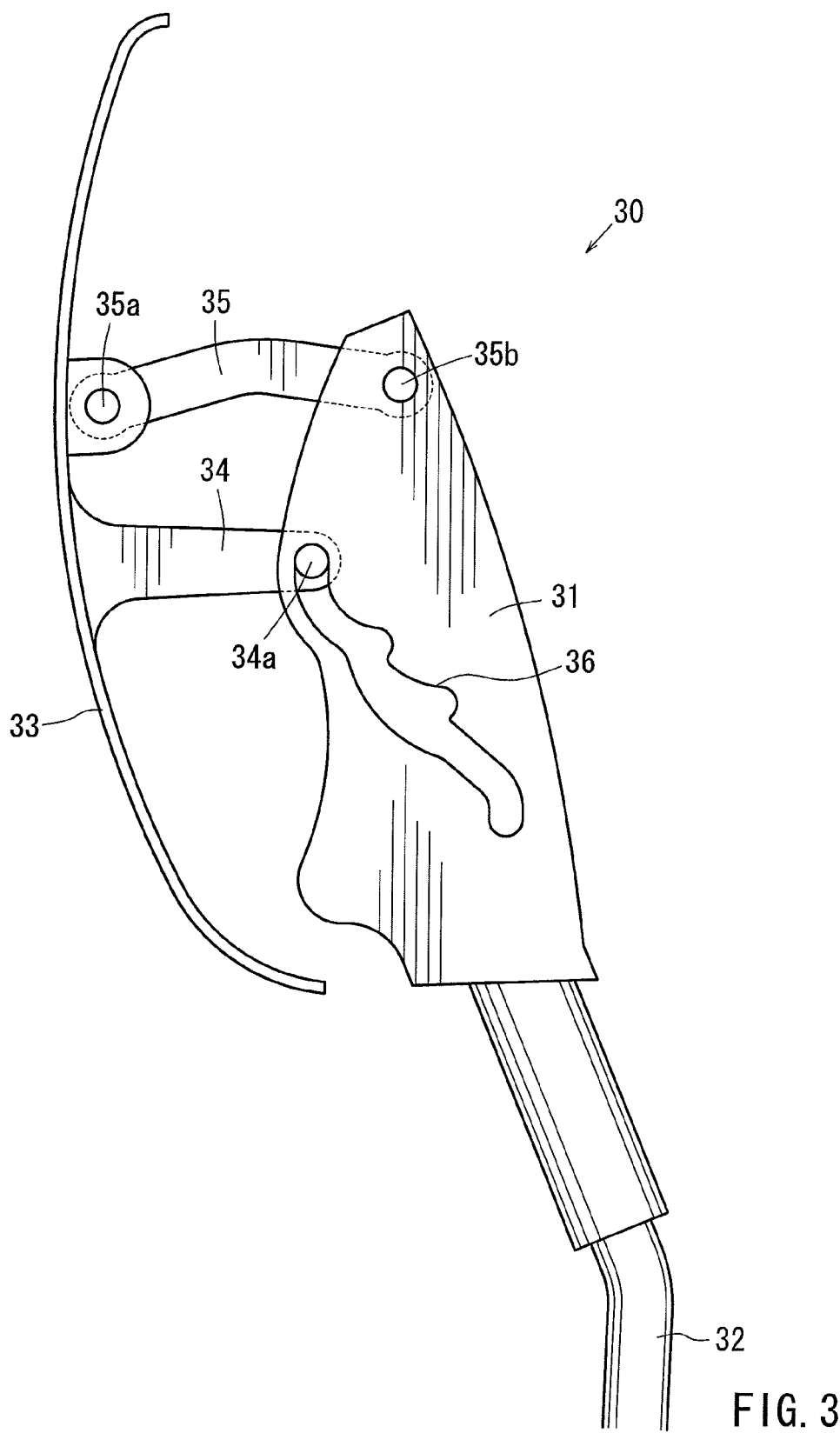
FIG. 3 is a side view of the head rest, illustrating a condition in which the head rest plate is in a projected position.

As shown in FIGS. 2 and 3, the linking mechanism is composed of a rigid arm 34, a movable linking arm 35, and an elongated slot 36 formed in the base element 31. The rigid arm 34 is fixedly connected to the head rest plate 33 so as to be projected rearwardly. A rearwardly projected end of the rigid arm 34 may preferably movably engage the slot 36 via a slide pin 34a so as to move or slide therealong. The linking arm 35 is pivotally connected to the head rest plate 33 via a pivot pin 35a. Also, the linking arm 35 is pivotally connected to the base element 31 via a pivot pin 35b. Thus, the head rest plate 33 is capable of moving between a retracted position (FIG. 2) and a projected position (FIG. 3) when the linking arm 35 is rotated about the pivot pin 35b. Further, the linking arm 35 is biased clockwise about the pivot pin 35b via a biasing member (not shown) such that the head rest plate 33 can be projected to the projected position. However, the linking arm 35 is normally rotated counterclockwise against a biasing force of the biasing member via a lock mechanism (not shown) of the head rest 30 (the head rest plate 33), so that the head rest plate 33 can be normally moved to and maintained in the retracted position. As will be recognized, when the lock mechanism is released or unlocked, the linking arm 35 can be rotated clockwise by the biasing force of the biasing member, so that the head rest plate 33 can be moved to the projected position from the retracted position.

The lock mechanism of the head rest 30 is associated to a lock release mechanism (a force transmission mechanism) that is attached to the seat back 20. As shown in, for example, FIGS. 4 and 5, the lock release mechanism may preferably include a clutch mechanism 40, a force receiving member 41, a first force transmission cable (a force output cable) 60 that is positioned between the clutch mechanism 40 and the lock mechanism, and a second force transmission cable (a force input cable) 70 that is positioned between the clutch mechanism 40 and the force receiving member 41.

Figure 4:
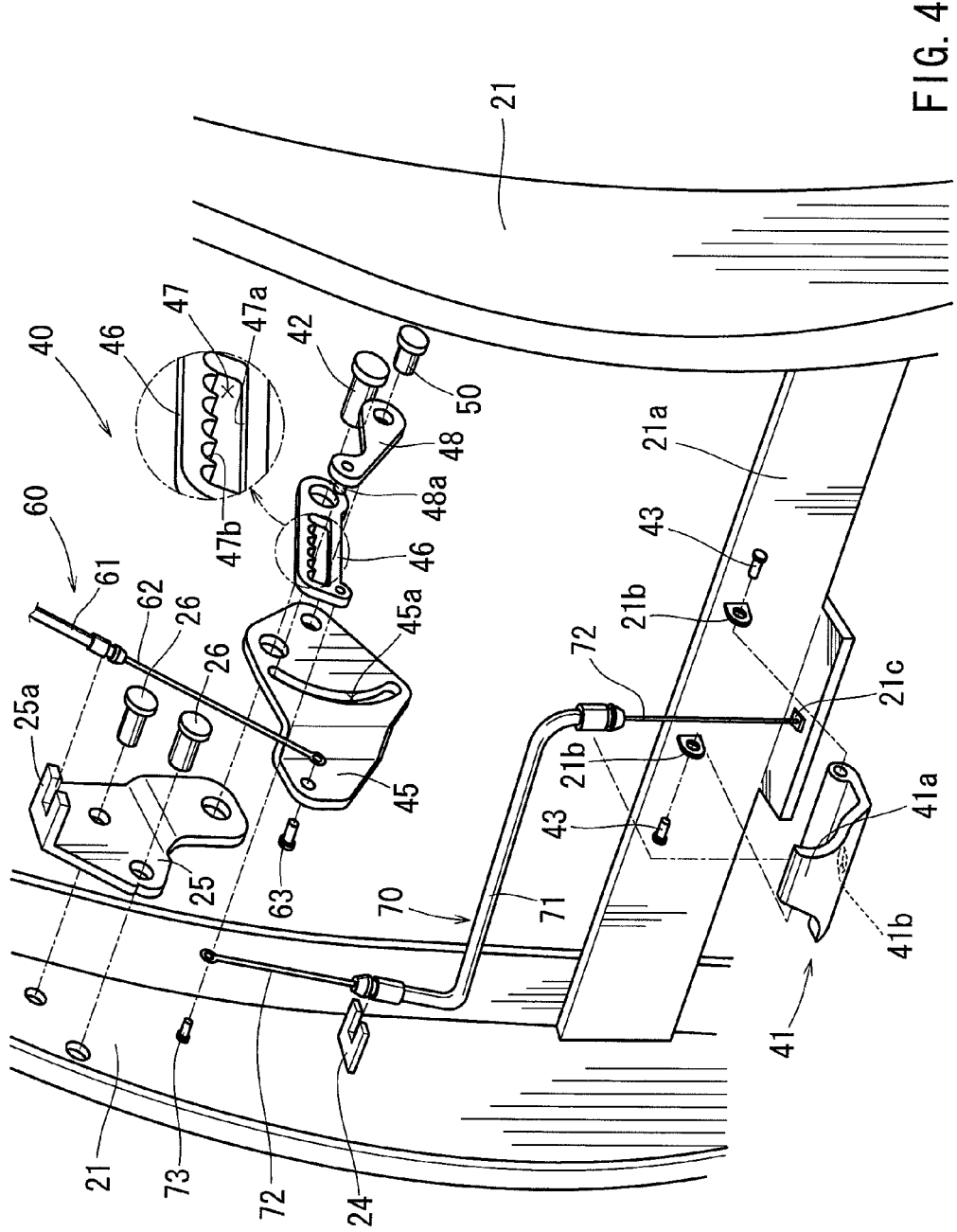
FIG. 4 is an exploded perspective view of the lock release mechanism (the clutch mechanism)

As best shown in FIG. 4, the clutch mechanism 40 may preferably include a plate-shaped base member 25, a plate-shaped rotatable bracket (an operation bracket) 45, an elongated plate-shaped rotatable arm 46, and an elongated plate-shaped swing arm 48.

The base member 25 is fixedly connected to an inner surface of either one of the side frame elements 21 (the right-hand side frame element 21 in this embodiment) via a pair of connector pins 26. The base member 25 has a transversely projected hook portion 25a.

The rotatable bracket 45 has substantially a pentagonal shape. The rotatable bracket 45 is rotatably connected to the base member 25 via a transversely directed pivot pin (a first pivot shaft) 42 at a corner portion thereof. Further, the rotatable bracket 45 has an elongated curved slot 45a (which will be hereinafter described). The rotatable bracket 45 thus formed is connected to the first force transmission cable 60 (which will be hereinafter described).

The rotatable arm 46 has substantially a rectangular shape. The rotatable arm 46 is rotatably connected to the base member 25 via the pivot pin 42 at one end portion thereof while the rotatable bracket 45 is interleaved therebetween. That is, the rotatable arm 46 is positioned to be laterally adjacent to the rotatable bracket 45 and is rotatably connected to the base member 25 via the pivot pin 42 (a common pivot pin). Further, the rotatable arm 46 is arranged so as to freely rotate relative to the rotatable bracket 45. The rotatable arm 46 has an elongated toothed slot 47 that is longitudinally formed therein. In particular, as best shown in FIG. 4, the toothed slot 47 has a non-toothed flattened longitudinal wall (a non-toothed portion) 47a (which correspond to a lower wall in this embodiment) and a toothed longitudinal wall (a toothed portion) 47b (which correspond to an upper wall in this embodiment). The rotatable arm 46 thus formed is connected to the second force transmission cable 70 (which will be hereinafter described) at the other end portion thereof.

The swing arm 48 is rotatably connected to the rotatable bracket 45 via a transversely directed pivot pin (a second pivot shaft) 50 at one end portion thereof. Further, the swing arm 48 may preferably connected to a corner portion of the rotatable bracket 45, which corner portion is positioned adjacent to the corner portion corresponding to the pivot pin 42. The swing arm 48 has an engagement projection (an engagement portion) 48a that is positioned at the other end portion thereof. The engagement projection 48a is laterally inwardly projected so as to slidably engage the curved slot 45a of the rotatable bracket 45 through the toothed slot 47 of the rotatable arm 46.

Further, the curved slot 45a of the rotatable bracket 45 may preferably have a circular arc shape centered on the pivot pin 50 and having a radius of curvature equal to a distance between the pivot pin 50 and the engagement projection 48a. Therefore, when the rotatable arm 46 is rotated about the pivot pin 42, the swing arm 48 can be smoothly rotated in the same direction about the pivot pin 50 while the engagement projection 48a moves along the toothed slot 47 of the rotatable arm 46 and the curved slot 45a of the rotatable bracket 45.

As best shown in FIG. 4, the force receiving member 41 is composed of a curved plate having a force receiving portion 41a and an outer cable attachment portion 41b. The force receiving member 41 is rotatably connected to a pair of attachment brackets 21b formed in the lower frame element 21a of the back frame F via a pair of transversely directed pivot pins 43, so as to be vertically rearwardly rotated about the pivot pins 43 when the force receiving portion 41a is pressed rearwardly by a back of a passenger sitting on the vehicle seat 1.

Figure 5:
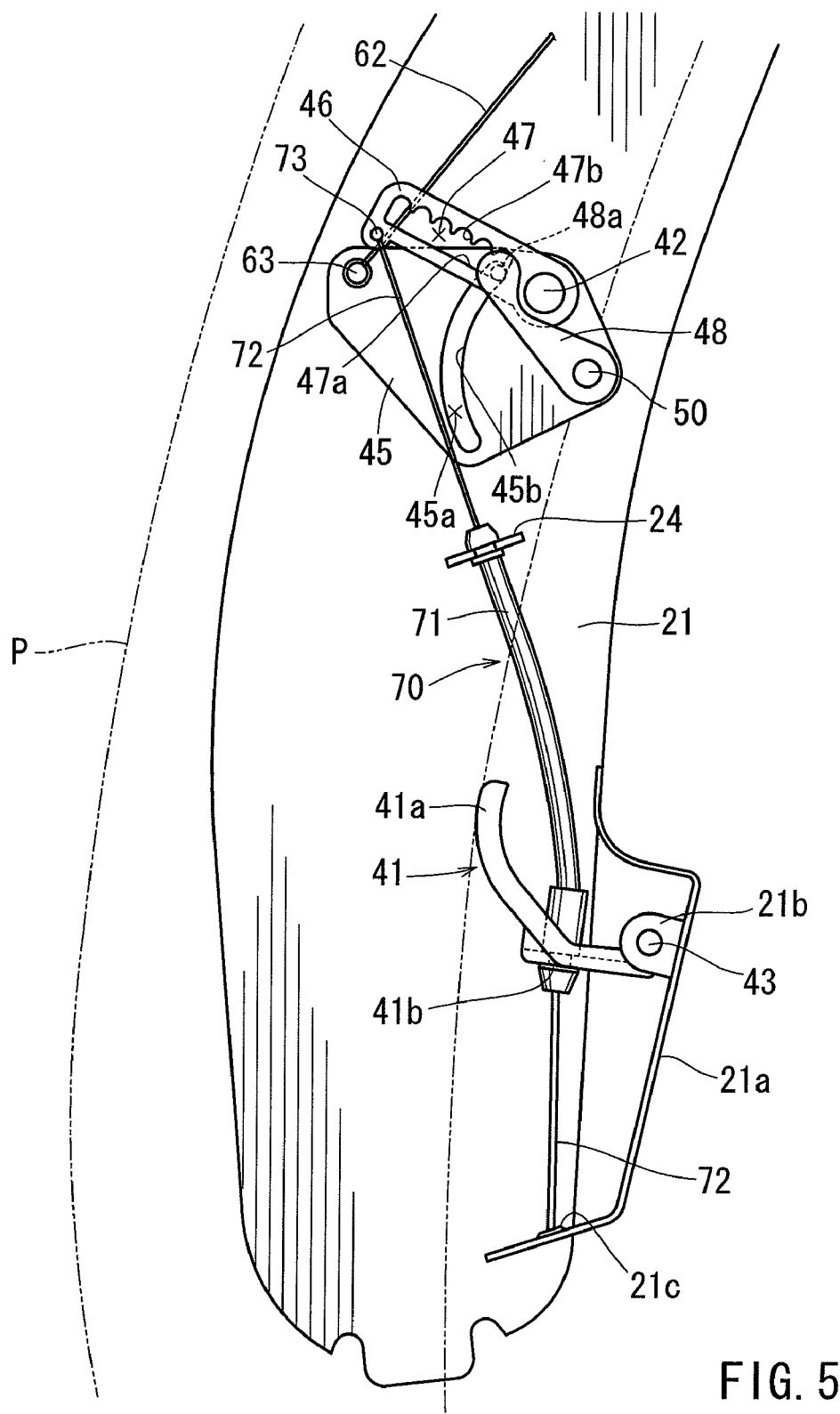
FIG. 5 is an explanatory view illustrating motion of the lock release mechanism (the clutch mechanism), which corresponds to a condition in which a passenger does not sit on the seat.

Further, at least one of the pivot pins 43 is provided with a torsion spring (not shown) of which the both ends respectively engage the force receiving member 41 and the lower frame element 21a, so that the force receiving member 41 can normally be biased vertically forwardly (i.e., counterclockwise in FIG. 5) about the pivot pins 43. That is, as shown in FIG. 5, the force receiving portion 41a of the force receiving member 41 may preferably normally contact an inner surface of the cushion member (which is shown by a reference sign P) of the seat back 20.

As will be appreciated, when the cushion member P of the seat back 20 is pressed rearwardly by the back of the passenger sitting on the vehicle seat 1, the force receiving portion 41a of the force receiving member 41 is correspondingly pressed rearwardly. As a result, the force receiving member 41 is vertically rearwardly (i.e., clockwise in FIG. 5) rotated about the pivot pins 43 against a spring force of the torsion spring.

Further, the torsion spring may simply function to contact the force receiving member 41 with the cushion member P of the seat back 20. Therefore, the torsion spring may preferably have a (small) force that is sufficient to contact the force receiving member 41 with the cushion member P.

As shown in FIGS. 1 and 4, the first force transmission cable 60 is composed of a flexible tubular outer member (sheath) 61, and an inner member (wire) 62 that is inserted into the outer member 61. As shown in FIG. 1, an upper end of the outer member 61 is attached to one of the stays 32 of the head rest 30. Conversely, a lower end of the outer member 61 is attached to the hook portion 25a of the base member 25. Further, an upper end of the inner member 62 is introduced into one of the stays 32 of the head rest 30 and is coupled to the lock mechanism of the head rest 30. Conversely, as best shown in FIG. 4, a lower end of the inner member 62 is attached to the rotatable bracket 45 via a connector pin 63. Further, the connector pin 63 may preferably be positioned at substantially a corner portion of the rotatable bracket 45, which corner portion is positioned diagonally opposite to the corner portion corresponding to the pivot pin 50.

Thus, when the rotatable bracket 45 is rotated forwardly (counterclockwise in FIG. 5), the inner member 62 of the first force transmission cable 60 is pulled, so that the lock mechanism of the head rest 30 can be unlocked. As a result, the head rest plate 33 can be projected to the projected position from the retracted position.

As shown in FIGS. 1 and 4, the second force transmission cable 70 is composed of a flexible tubular outer member (sheath) 71, and an inner member (wire) 72 that is inserted into the outer member 71. An upper end of the outer member 71 is attached to an attachment bracket 24 that is fixedly attached to the right-hand side frame element 21. Conversely, a lower end of the outer member 71 is attached to the outer cable attachment portion 41b of the force receiving member 41. Further, an upper end of the inner member 72 is connected to the other end portion (free end portion) of the rotatable arm 46 via a connector pin 73. Conversely, as best shown in FIG. 4, a lower end of the inner member 72 is attached to an attachment portion 21c that is formed in the lower frame element 21a.

Thus, when the force receiving member 41 is vertically rearwardly (clockwise in FIG. 5) rotated about the pivot pins 43, the inner member 72 of the second force transmission cable 70 is pulled, so that the rotatable arm 46 can be rotated forwardly (counterclockwise in FIG. 5) about the pivot pin 42.

Further, in a (normal) condition in which a passenger does not sit on the seat and in which a load or force is not applied to the cushion member P of the seat back 20 (i.e., the force receiving portion 41a of the force receiving member 41 is not pressed rearwardly), the rotatable bracket 45, the rotatable arm 46 and the swing arm 48 are respectively positioned at uppermost angular positions (FIG. 5). Further, as shown in FIG. 5, the curved slot 45a of the rotatable bracket 45 may preferably be formed such that the engagement projection 48a of the swing arm 48 can be positioned at substantially an uppermost end of the curved slot 45a when the rotatable bracket 45, the rotatable arm 46 and the swing arm 48 are positioned at these angular positions. Similarly, the toothed slot 47 of the rotatable arm 46 may preferably be formed such that the engagement projection 48a of the swing arm 48 can be positioned at substantially a proximal end of the toothed slot 47 when the rotatable bracket 45, the rotatable arm 46 and the swing arm 48 are positioned at these angular positions.

Next, an operation of the lock release mechanism (in particular, the clutch mechanism 40) thus constructed will be described.

Figure 6:
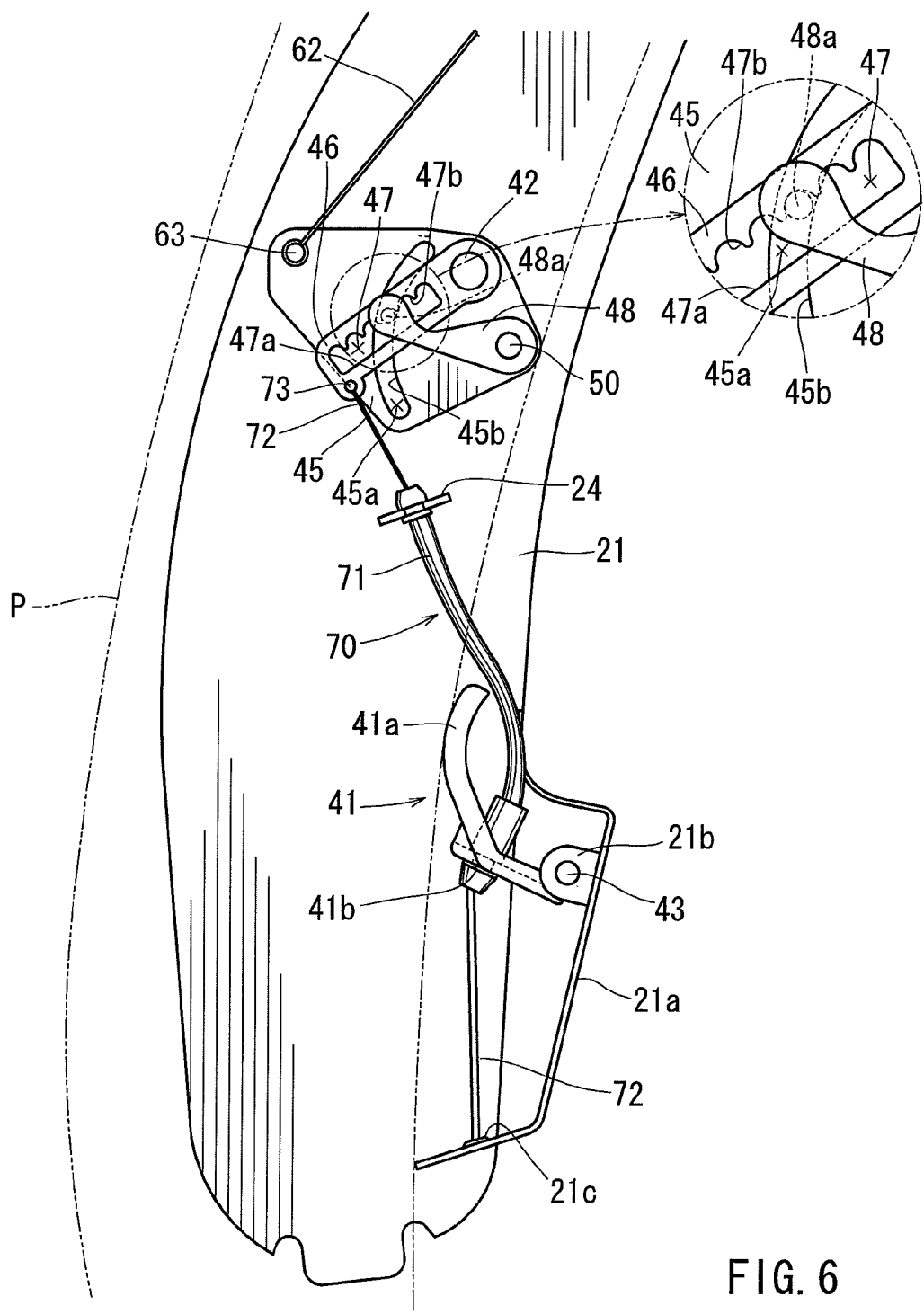
FIG. 6 is an explanatory view illustrating the motion of the lock release mechanism, which corresponds to an initial condition after a force is applied quickly to the lock release mechanism via a back of the passenger sitting on the seat.

In the condition shown in FIG. 5, when the force is applied quickly to the cushion member P of the seat back 20 by the back of the passenger sitting on the vehicle seat 1 (for example, when a back-side collision of a vehicle happens), the force receiving portion 41a of the force receiving member 41 is quickly pressed rearwardly. As a result, as shown in FIG. 6, the force receiving member 41 is vertically rearwardly (clockwise) rotated about the pivot pins 43 against the spring force of the torsion spring (not shown). Upon rotation of the force receiving member 41, as previously described, the inner member 72 of the second force transmission cable 70 is pulled downwardly, so that the rotatable arm 46 can be rotated forwardly (counterclockwise) about the pivot pin 42. At the same time, the swing arm 48 can be rotated forwardly (counterclockwise) by a gravitational force about the pivot pin 50 along with rotation of the rotatable arm 46 while the engagement projection 48a moves along the toothed slot 47 of the rotatable arm 46 and the curved slot 45a of the rotatable bracket 45.

At this time, the rotatable arm 46 can be rotated quickly because the force is applied quickly to the cushion member P (the force receiving member 41) whereas the swing arm 48 is rotated slowly because it is rotated only by the gravitational force. That is, the rotatable arm 46 can be rotated faster than the swing arm 48. As a result, as shown in FIG. 6, the engagement projection 48a of the swing arm 48 can engage the toothed wall 47b of the toothed slot 47 immediately after the rotatable arm 46 starts to rotate. At this time, the engagement projection 48a can be pressed to an inside surface 45b of the curved slot 45a of the rotatable bracket 45. Thus, the rotatable arm 46 can be effectively prevented from rotating forwardly relative to the rotatable bracket 45. As a result, the rotatable arm 46 can be rotationally locked with respect to the rotatable bracket 45. That is, the rotatable arm 46 can be mechanically integrated with the rotatable bracket 45.

Figure 7:
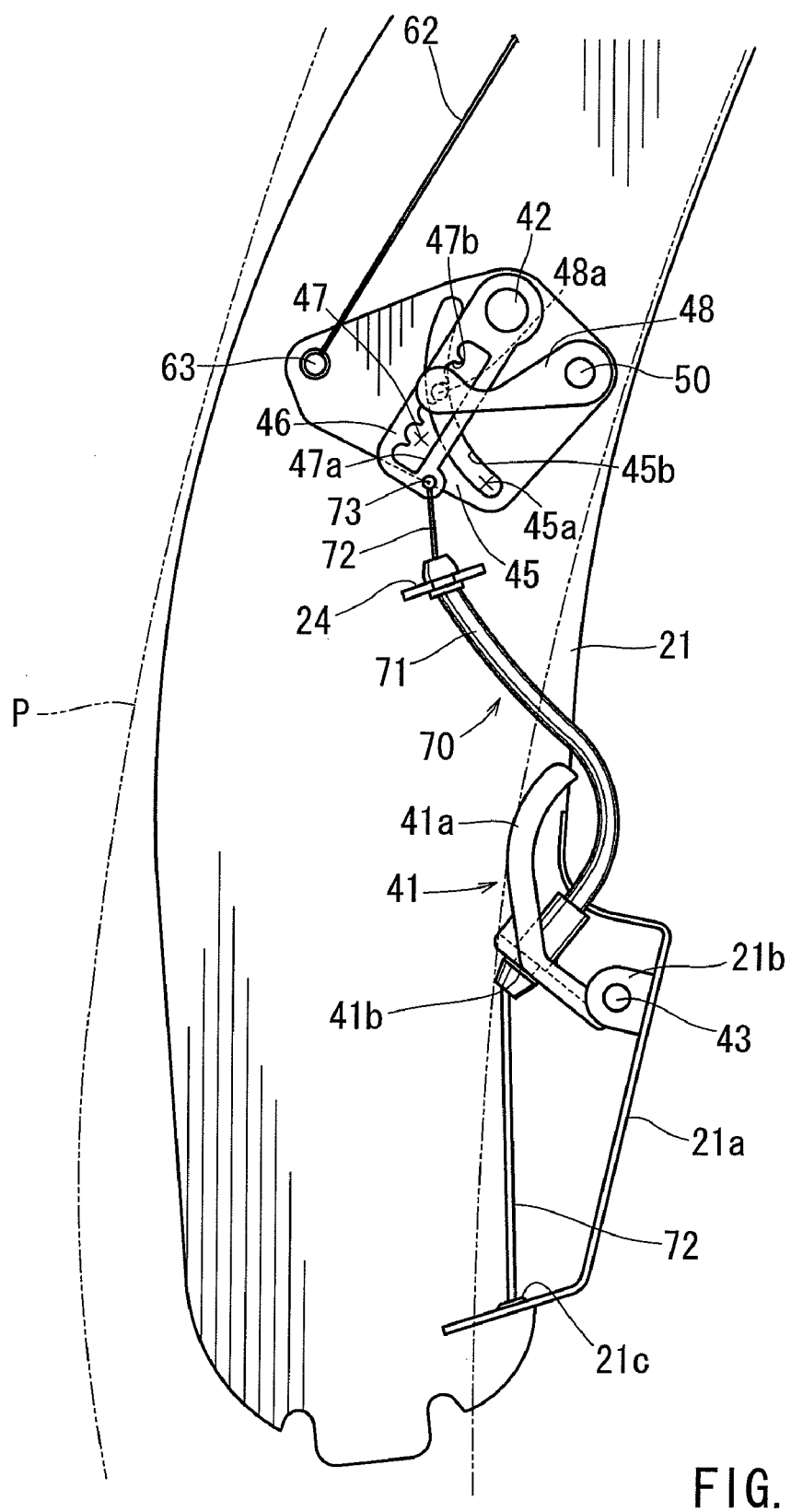
FIG. 7 is an explanatory view illustrating the motion of the clutch mechanism, which corresponds to a final condition after the force is applied quickly to the lock release mechanism.

When the force receiving portion 41a of the force receiving member 41 is further (quickly) pressed rearwardly after the engagement projection 48a of the swing arm 48 engages the toothed wall 47b of the toothed slot 47 (i.e., after the rotatable arm 46 is rotationally locked with respect to the rotatable bracket 45), as shown in FIG. 7, the rotatable bracket 45 can be rotated forwardly (counterclockwise) with the rotatable arm 46 about the pivot pin 42.

Upon counterclockwise rotation of the rotatable bracket 45, as previously described, the inner member 62 of the first force transmission cable 60 is pulled downwardly (i.e., the force is transmitted to the force output cable), so that the lock mechanism of the head rest 30 can be unlocked. As a result, the head rest plate 33 of the head rest 30 can be moved to the projected position from the retracted position.

Thus, if the back-side collision of the vehicle happens, the head rest main body (the head rest plate 33) moves closer to a head of the passenger, so that the head of the passenger can be quickly and reliably supported by the head rest main body. Therefore, the passenger can be prevented from suffering an injury, such as whiplash.

Figure 8:
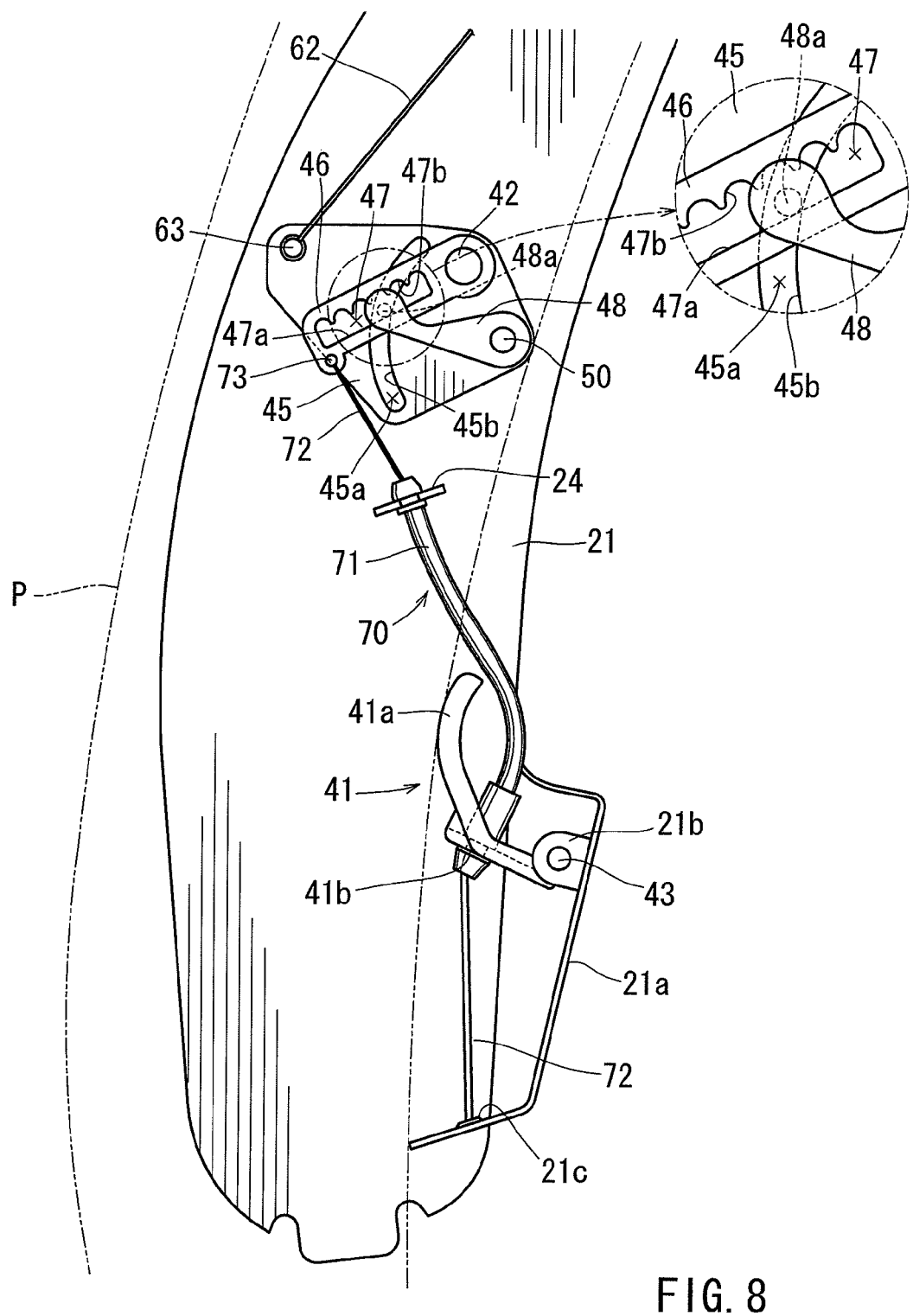
FIG. 8 is an explanatory view similar to FIG. 6, which corresponds to an initial condition after the force is applied slowly to the lock release mechanism.

Conversely, when the force is applied slowly to the cushion member P of the seat back 20 by the back of the passenger (for example, when the passenger normally gets in and out the vehicle seat 1), the force receiving portion 41a of the force receiving member 41 is slowly pressed rearwardly. As a result, as shown in FIG. 8, the force receiving member 41 is vertically rearwardly (clockwise) rotated about the pivot pins 43 against a spring force of the torsion spring (not shown). Upon rotation of the force receiving member 41, the inner member 72 of the second force transmission cable 70 is pulled downwardly, so that the rotatable arm 46 can be rotated forwardly (counterclockwise) about the pivot pin 42. At the same time, the swing arm 48 can be rotated forwardly (counterclockwise) by the gravitational force about the pivot pin 50 while the engagement projection 48a moves along the toothed slot 47 of the rotatable arm 46 and the curved slot 45a of the rotatable bracket 45.

At this time, the rotatable arm 46 can be rotated slowly because the force is applied slowly to the cushion member P (the force receiving member 41) while the swing arm 48 is rotated slowly because it is rotated only by the gravitational force. That is, the rotatable arm 46 can be rotated at substantially the same speed as the swing arm 48. As a result, as shown in FIG. 8, the engagement projection 48a of the swing arm 48 cannot engage the toothed wall 47b of the toothed slot 47. In other words, the engagement projection 48a of the swing arm 48 can freely move along the non-toothed wall 47a of the toothed slot 47. Thus, the rotatable arm 46 can be rotated about the pivot pin 42 while rotating the swing arm 48 about the pivot pin 50. That is, the rotatable arm 46 can be rotated without interfering with the swing arm 48 (the engagement projection 48a). As a result, the rotatable arm 46 can continuously rotate forwardly relative to the rotatable bracket 45. In other words, the rotatable arm 46 cannot be rotationally locked with respect to the rotatable bracket 45.

Figure 9:
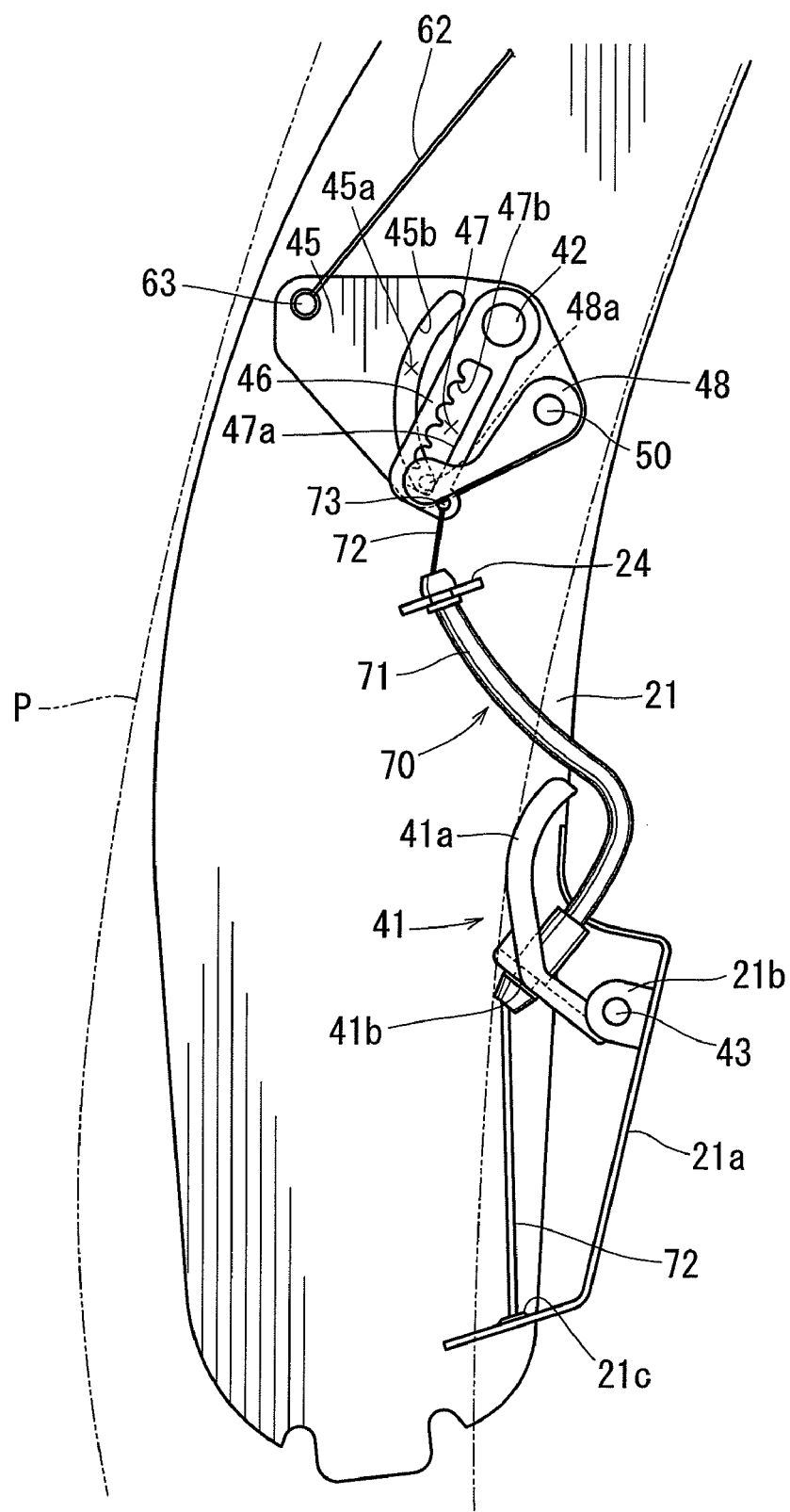
FIG. 9 is an explanatory view similar to FIG. 7, which corresponds to a final condition after the force is applied slowly to the lock release mechanism.

When the force receiving portion 41a of the force receiving member 41 is further (slowly) pressed rearwardly, as shown in FIG. 9, the rotatable arm 46 can be further rotated about the pivot pin 42 while rotating the swing arm 48 about the pivot pin 50 until the engagement projection 48a of the swing arm 48 reaches a proximal end of the toothed slot 47 of the rotatable arm 46. At this time, the rotatable bracket 45 cannot be rotated forwardly (counterclockwise) because the rotatable arm 46 is not rotationally locked with respect to the rotatable bracket 45.

As described above, when the force is applied slowly to the cushion member P of the seat back 20, the rotatable bracket 45 cannot be rotated with the rotatable arm 46. Therefore, the inner member 62 of the first force transmission cable 60 is not pulled (i.e., the force is not transmitted to the force output cable), so that the lock mechanism of the head rest 30 cannot be unlocked. As a result, the head rest plate 33 of the head rest 30 can be maintained in the retracted position.

Thus, even if the force is applied to the cushion member P of the seat back 20 due to normal movements of the passenger, the head rest plate 33 of the head rest 30 cannot be projected. Therefore, the passenger can normally be prevented from suffering discomfort.

According to the lock release mechanism of the present embodiment, the force that is applied quickly to the cushion member P of the seat back 20 can be reliably transmitted to the rotatable bracket 45 of the clutch mechanism 40 without being influenced by an ambient temperature. Therefore, when the force is applied quickly to the cushion member P of the seat back 20, the clutch mechanism 40 may properly function regardless of the ambient temperature. As a result, the force can be reliably transmitted to the lock mechanism of the head rest 30, so as to unlock the lock mechanism of the head rest 30. Thus, if the back-side collision of the vehicle happens, the head rest plate 33 of the head rest 30 can be projected to the projected position from the retracted position, so that the head of the passenger can be quickly and reliably supported thereby.

In addition, because the swing arm 48 is arranged and constructed to be rotated forwardly (counterclockwise) by the gravitational force about the pivot pin 50, it is not necessary to use springs or other such biasing members. Therefore, the clutch mechanism 40 may have a simplified structure. This may lead to an reduced manufacturing cost of the clutch mechanism 40 (the lock release mechanism).

Naturally, various changes and modifications may be made to the present invention without departing from the scope of the invention. For example, sizes and shapes of the rotatable bracket 45 (the curved slot 45a) and the rotatable arm 46 (the toothed slot 47) can be changed in consideration of a body type and a body size of the passenger, if necessary.

Further, in this embodiment, the force receiving portion 41a of the force receiving member 41 is pressed to the inner surface of the cushion member P of the seat back 20 by the spring force of the torsion spring. However, the force receiving portion 41a of the force receiving member 41 can be connected or bonded to the inner surface of the cushion member P of the seat back 20, if necessary.

The invention claimed is:

1. A clutch mechanism for selectively transmitting a force applied thereto, comprising:
    an operation bracket that is rotatably connected to the vehicle seat via a first pivot shaft and is connected to a force output cable, the operation bracket including a curved slot formed therein;
    a rotatable arm that is rotatably connected to the operation bracket via the first pivot shaft and is connected to a force input cable, the rotatable arm including an elongated slot that has a toothed portion; and
    a swing arm that is rotatably connected to the operation bracket via a second pivot shaft, the swing arm including an engagement portion that movably engages both of the curved slot of the operation bracket and the elongated slot of the rotatable arm,
    wherein when the force is applied quickly to the force input cable, the rotatable arm is rotated quickly about the first pivot shaft relative to the operation bracket whereas the swing arm is rotated slowly by a gravitational force about the second pivot shaft along with rotation of the rotatable arm, and as a result, the engagement portion of the swing arm engages the toothed portion of the elongated slot of the rotatable arm, wherein upon engagement of the engagement portion of the swing arm and the toothed portion of the rotatable arm, the rotatable arm can be rotationally locked with respect to the operation bracket, so that the operation bracket is rotated with the rotatable arm about the first pivot shaft, thereby allowing transmission of the force to the force output cable, wherein when the force is applied slowly to the force input cable, the rotatable arm is rotated slowly about the first pivot shaft relative to the operation bracket while the swing arm is rotated slowly by the gravitational force about the second pivot shaft along with rotation of the rotatable arm, and as a result, the rotatable arm is continuously rotated relative to the operation bracket while moving the engagement portion of the swing arm along the elongated slot of the rotatable arm and the curved slot of the operation bracket, and wherein upon continuous rotation of the rotatable arm relative to the operation bracket, the operation bracket can be prevented from being rotated about the first pivot shaft, thereby inhibiting the transmission of the force to the force output cable.

2. A force transmission mechanism for selectively transmitting a force applied to a vehicle seat by a passenger that comprises:

a force input cable, a force output cable, a force receiving member and a clutch mechanism, the force receiving member being arranged and constructed to pull the force input cable when the force is applied to the vehicle seat, the clutch mechanism including:

an operation bracket that is rotatably connected to the vehicle seat via a first pivot shaft and is connected to the force output cable, the operation bracket including a curved slot formed therein;

a rotatable arm that is rotatably connected to the operation bracket via the first pivot shaft and is connected to the force input cable, the rotatable arm including an elongated slot that has a toothed portion; and a swing arm that is rotatably connected to the operation bracket via a second pivot shaft, the swing arm including an engagement portion that movably engages both of the curved slot of the operation bracket and the elongated slot of the rotatable arm, wherein when the force is applied quickly to the vehicle seat such that the force input cable is quickly pulled, the rotatable arm is rotated quickly about the first pivot shaft relative to the operation bracket whereas the swing arm is rotated slowly by a gravitational force about the second pivot shaft along with rotation of the rotatable arm, and as a result, the engagement portion of the swing arm engages the toothed portion of the elongated slot of the rotatable arm, wherein upon engagement of the engagement portion of the swing arm and the toothed portion of the rotatable arm, the rotatable arm can be rotationally locked with respect to the operation bracket, so that the operation bracket is rotated with the rotatable arm about the first pivot shaft, thereby allowing transmission of the force to the force output cable, wherein when the force is applied slowly to the vehicle seat such that the force input cable is slowly pulled, the rotatable arm is rotated slowly about the first pivot shaft relative to the operation bracket while the swing arm is rotated slowly by the gravitational force about the second pivot shaft along with rotation of the rotatable arm, and as a result, the rotatable arm is continuously rotated relative to the operation bracket while moving the engagement portion of the swing arm along the elongated slot of the rotatable arm and the curved slot of the operation bracket, and wherein upon continuous rotation of the rotatable arm relative to the operation bracket, the operation bracket can be prevented from being rotated about the first pivot shaft, thereby inhibiting the transmission of the force to the force output cable.

3. The force transmission mechanism as defined in claim 2, wherein the force receiving member is rotatably attached to the vehicle seat and is coupled to the force input cable, and wherein the force receiving member is arranged and constructed to rotate so as to pull the force input cable when the force is applied to the vehicle seat.

4. The force transmission mechanism as defined in claim 2, wherein the force output cable is associated with an active head rest attached to the vehicle seat.

5. The force transmission mechanism as defined in claim 4, wherein the head rest comprises a movable head rest main body that is normally maintained in a retracted position via a lock mechanism, and wherein the lock mechanism is arranged and constructed to be unlocked when the force is transmitted to the force output cable via the clutch mechanism, so that the head rest main body can be moved to a projected position via a biasing member.

* * * * *